United States Patent [19]

Kageyama

[11] Patent Number: 5,416,533
[45] Date of Patent: May 16, 1995

[54] APPARATUS FOR CORRECTING A BLACK LEVEL OF A VIDEO SIGNAL

[75] Inventor: Atsuhisa Kageyama, Osaka, Japan

[73] Assignee: Matsushita Electric Industrial Co., Ltd., Osaka, Japan

[21] Appl. No.: 898,366

[22] Filed: Jun. 15, 1992

Related U.S. Application Data

[62] Division of Ser. No. 708,141, May 30, 1991.

[30] Foreign Application Priority Data

Jun. 5, 1990 [JP] Japan ................... 2-148285

[51] Int. Cl.[6] .......................... H04N 5/16; H04N 9/72
[52] U.S. Cl. ...................... 348/673; 348/692; 348/652
[58] Field of Search ............ 358/21 R, 21 V, 26, 358/27, 29, 29 C, 32, 34, 37, 39, 40, 163, 164, 168; H04N 9/73, 5/57, 5/20; 348/673, 652, 692, 675, 671, 644

[56] References Cited

U.S. PATENT DOCUMENTS

| | | | |
|---|---|---|---|
| 4,164,750 | 8/1979 | Hosoya | 358/26 |
| 4,316,215 | 2/1982 | Yasumoto | 358/37 |
| 4,337,479 | 6/1982 | Tomimoto | 358/37 |
| 4,489,349 | 12/1984 | Okada | 358/168 |
| 4,633,299 | 12/1986 | Tanaka | 358/29 |
| 4,717,953 | 1/1988 | Chang | 358/39 |
| 4,811,101 | 3/1989 | Yagi | 358/171 |
| 4,812,905 | 3/1989 | Rossi | 358/32 |
| 4,922,330 | 5/1990 | Saito | 358/29 C |
| 4,954,884 | 9/1990 | Nakayama | 358/29 C |
| 5,134,465 | 7/1992 | Ohki | 358/29 |

FOREIGN PATENT DOCUMENTS

2196588 8/1990 Japan.
3148987 6/1991 Japan.

OTHER PUBLICATIONS

IEEE Transactions on Consumer Electronics, vol. 36, Aug. 1990, No. 3, pp. 699-706, New York, US., Imaizumi & Al.: "Development of Multifonctional NTSC System Signal-Chip LSI for Higher Picture and Sound Quality".

Primary Examiner—James J. Groody
Assistant Examiner—Sherrie Hsia
Attorney, Agent, or Firm—Lowe, Price, LeBlanc & Becker

[57] ABSTRACT

A pedestal clamping device clamps a pedestal level of an input video signal in response to a predetermined pedestal voltage, and converts the input video signal into a clamped video signal. A black-level expanding device expands a tone of a black portion of the clamped video signal, and converts the clamped video signal into a black-level expanded video signal. A color greatest detecting device detects a greatest of color signals of the input video signal. A adding device adds an output signal from the color greatest detecting device and the pedestal voltage. A black-level comparing device detects a blackest portion of the black-level expanded video signal; compares the detected blackest portion of the black-level expanded video signal with the output signal from the adding device; and controls a degree of expanding the black tone by the black-level expanding device in response to a difference between the detected blackest portion of the black-level expanded video signal and the output signal from the adding device.

8 Claims, 5 Drawing Sheets

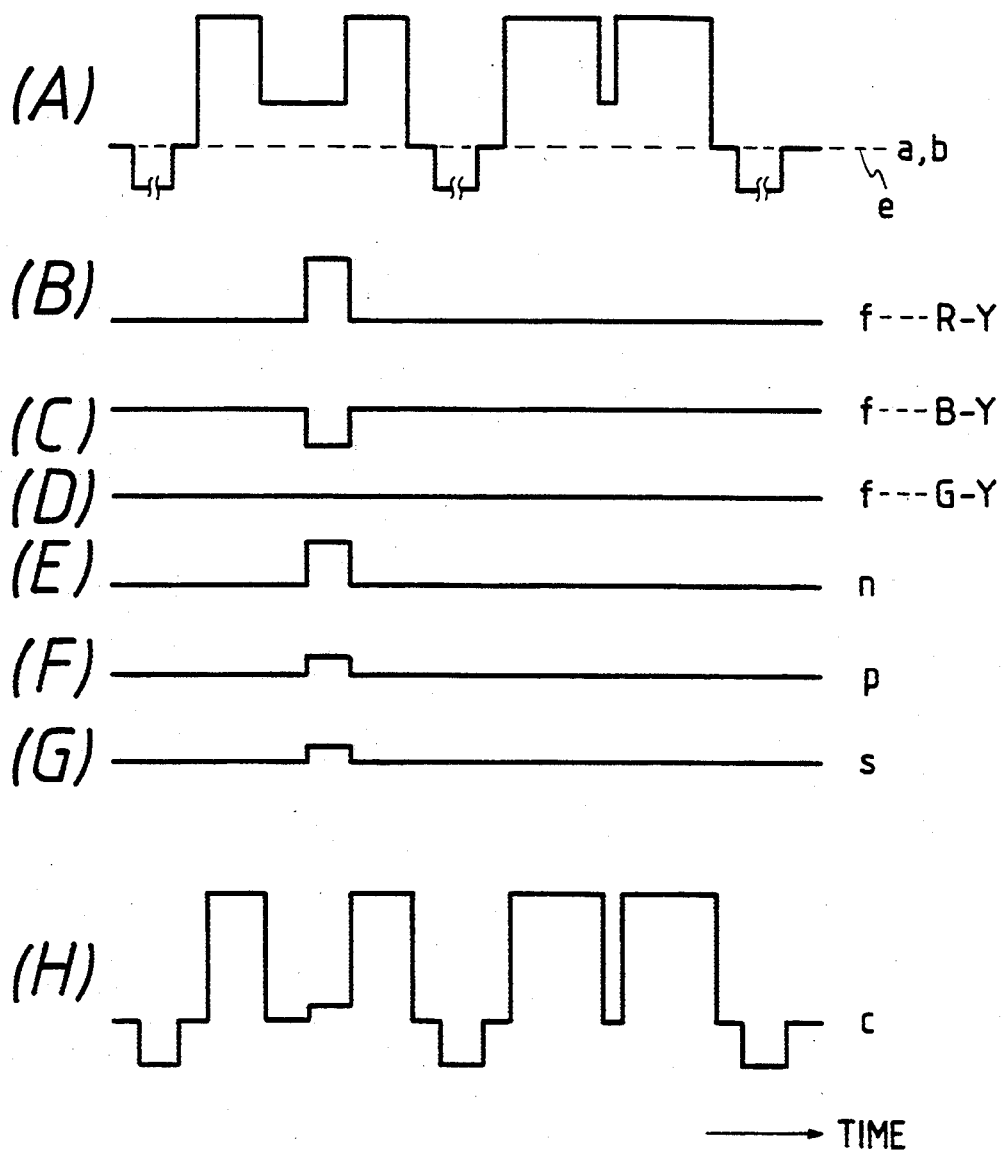

APPARATUS FOR CORRECTING A BLACK LEVEL OF A VIDEO SIGNAL

This application is a division of application Ser. No. 07/708,141, filed May 30, 1991.

BACKGROUND OF THE INVENTION

This invention relates to an apparatus for correcting a black level of a video signal.

In the field of color television receivers, there are various apparatuses for correcting a color-tone component of a video signal to widen the dynamic range of a reproduced color image and thereby to clarify the reproduced color image. Some of such color-tone correcting apparatuses have a non-linear amplifier for processing a video signal. Black-level correcting apparatuses are of one type of such color-tone correcting apparatuses. As will be explained later, a prior art black-level correcting apparatus has some problem.

SUMMARY OF THE INVENTION

It is an object of this invention to provide an improved apparatus for correcting a black level of a video signal.

According to a first aspect of this invention, an apparatus for correcting a black level of a video signal comprises pedestal clamping means for clamping a pedestal level of an input video signal in response to a predetermined pedestal voltage, and converting the input video signal into a clamped video signal; black-level expanding means for expanding a tone of a black portion of the clamped video signal, and converting the clamped video signal into a black-level expanded video signal; color greatest detecting means for detecting a greatest of color signals of the input video signal; adding means for adding an output signal from the color greatest detecting means and the pedestal voltage; and black-level comparing means, responsive to the black-level expanded video signal and an output signal from the adding means, for detecting a blackest portion of the black-level expanded video signal, comparing the detected blackest portion of the black-level expanded video signal with the output signal from the adding means, and controlling a degree of expanding the black tone by the black-level expanding means in response to a difference between the detected blackest portion of the black-level expanded video signal and the output signal from the adding means.

According to a second aspect of this invention, an apparatus for correcting a black level of a video signal comprises a pedestal clamp circuit for clamping a pedestal level of an input luminance signal in response to a predetermined pedestal voltage, and converting the input luminance signal into a clamped luminance signal; a black-level expanding circuit for expanding a tone of a black portion of the clamped luminance signal, and converting the clamped luminance signal into a black-level expanded luminance signal; a color greatest detecting circuit for detecting a greatest of input color difference signals; a level limiting circuit for limiting a level of an output signal from the color greatest detecting circuit to within a predetermined range; a gain control circuit for controlling an amplitude of an output signal from the level limiting circuit; an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by the black-level expanding circuit in response to a difference between the detected blackest portion of the black-level expanded luminance signal and the output signal from the adding circuit.

According to a third aspect of this invention, an apparatus for correcting a black level of a video signal comprises a pedestal clamp circuit for clamping a pedestal level of an input luminance signal in response to a predetermined pedestal voltage, and converting the input luminance signal into a clamped luminance signal; a black-level expanding circuit for expanding a tone of a black portion of the clamped luminance signal and converting the clamped luminance signal into a black-level expanded luminance signal; an average luminance level detecting circuit for detecting an average luminance level of the black-level expanded luminance signal, and outputting an average luminance detection signal representative thereof; a gain control circuit for controlling an amplitude of the average luminance detection signal; an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by the black-level expanding circuit in response to a difference between the detected blackest portion of the black-level expanded luminance signal and the output signal from the adding circuit.

According to a fourth aspect of this invention, an apparatus for correcting a black level of a video signal comprises a pedestal clamp circuit for clamping a pedestal level of an input luminance signal in response to a predetermined pedestal voltage, and converting the input luminance signal into a clamped luminance signal; a black-level expanding circuit for expanding a tone of a black portion of the clamped luminance signal, and converting the clamped luminance signal into a black-level expanded luminance signal; a color detection matrix circuit for detecting a predetermined-color portion in response to an input color difference signal; a gain control circuit for controlling an amplitude of an output signal from the color detection matrix circuit; an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by the black-level expanding circuit in response to a difference between the detected blackest portion of the black-level expanded luminance signal and the output signal from the adding circuit.

According to a fifth aspect of this invention, an apparatus for correcting a black level of a video signal comprises a pedestal clamp circuit for clamping a pedestal level of an input luminance signal in response to a predetermined pedestal voltage, and converting the input luminance signal into a clamped luminance signal; a black-level expanding circuit for expanding a tone of a black portion of the clamped luminance signal, and converting the clamped luminance signal into a black-level expanded luminance signal; a color detection matrix circuit for detecting a predetermined-color portion in response to an input color demodulation signal; a gain control circuit for controlling an amplitude of an output signal from the color detection matrix circuit; an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by the black-level expanding circuit in response to a difference between the detected blackest portion of the black-level expanded luminance signal and the output signal from the adding circuit.

According to a sixth aspect of this invention, in an apparatus for controlling a black level of luminance components of a video signal with respect to a reference level in a closed-loop control, the improvement comprises means for detecting whether or not an image represented by the video signal has a color different from a black-and-white color, and outputting a detection signal representative thereof; and means for varying the reference level in response to the detection signal.

According to a seventh aspect of this invention, in an apparatus for controlling a black level of luminance components of a video signal with respect to a reference level in a closed-loop control, the improvement comprises means for detecting an average of levels of the luminance components of the video signal, and outputting a detection signal representative thereof; and means for varying the reference level in response to the detection signal.

According to an eighth aspect of this invention, in an apparatus for controlling a black level of luminance components of a video signal with respect to a reference level in a closed-loop control, the improvement comprises means for detecting a component of the video signal which corresponds to a predetermined color different from a black-and-white color, and outputting a detection signal representative thereof; and means for varying the reference level in response to the detection signal.

BRIEF DESCRIPTION OF THE DRAWINGS

FIG. 6 is a time-domain diagram showing the waveforms of various signals in the black-level correcting apparatus of FIG. 5.

DESCRIPTION OF THE PRIOR ART

Figure 1:
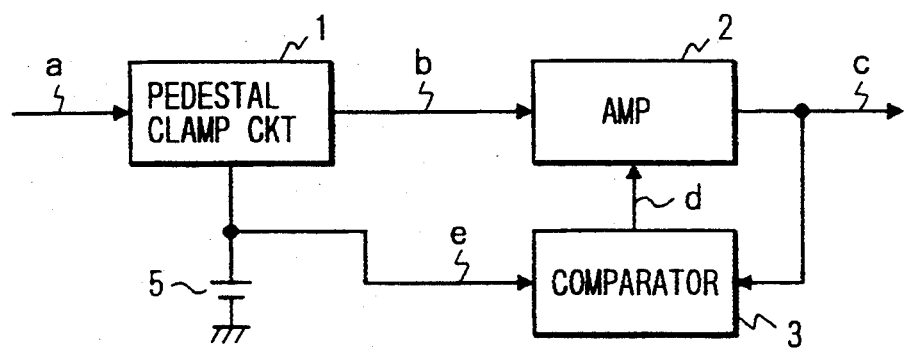
FIG. 1 is a block diagram of a prior art black-level correcting apparatus.

As shown in FIG. 1, a prior art black-level correcting apparatus includes a pedestal clamping circuit 1, a variable-gain amplifier 2, and a black-level comparator 3.

Figure 2:
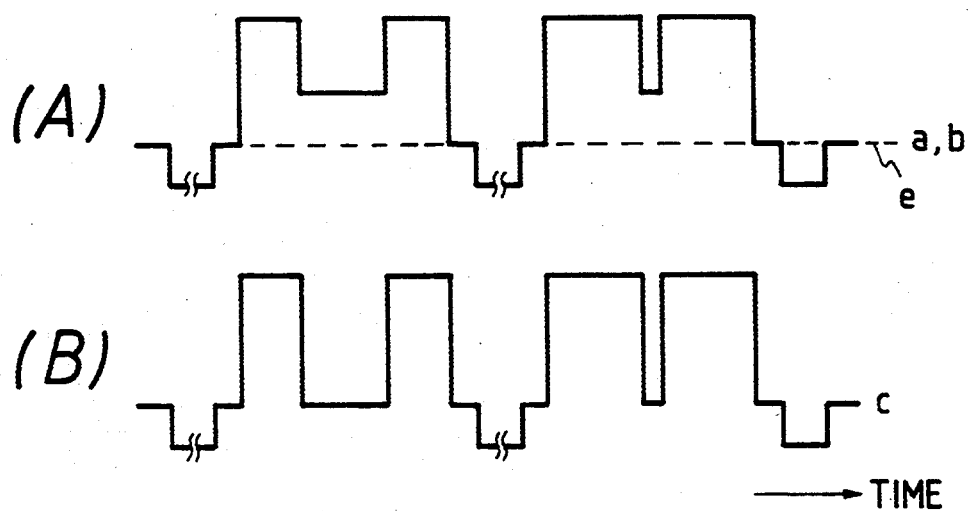
FIG. 2 is a time-domain diagram showing the waveforms of signals in the prior art black-level correcting apparatus of FIG. 1.

The pedestal clamping circuit 1 receives an input luminance signal "a" which has a waveform such as shown in the part (A) of FIG. 2. The pedestal clamping circuit 1 receives a predetermined pedestal voltage "e" from a dc voltage source 5. The pedestal clamping circuit 1 subjects the input luminance signal "a" to a clamping process responsive to the pedestal voltage "e", and converts the input luminance signal "a" into a clamped luminance signal "b". The clamped luminance signal "b" has a waveform such as shown in the part (A) of FIG. 2.

The amplifier 2 receives the clamped luminance signal "b" from the pedestal clamping circuit 1. The amplifier 2 receives a control signal "d" from the black-level comparator 3. The amplifier 2 expands time tone of a black portion of the clamped luminance signal "b" in response to the control signal "d", and converts the clamped luminance signal "b" into an output luminance signal "c". The output luminance signal "c" has a waveform such as shown in the part (B) of FIG. 2. The gain of tile amplifier 2 is determined by the control signal "d", so that the degree of the expansion of the black tone depends on the control signal "d".

The black-level comparator 3 receives the output luminance signal "c" from the amplifier 2. The black-level comparator 3 receives the pedestal voltage "e" from the dc voltage source 5. The black-level comparator 3 has a composite structure, including a black-level detector and a comparing section. The black-level detector detects the lowest level of a picture information part of the output luminance signal "c", that is, the level of the darkest picture information segment of the output luminance signal "c". The comparing section compares the detected level of the darkest picture information segment of the output luminance signal "c" with the pedestal voltage "e", and generates the control signal "d" in response to the result of the comparison.

The amplifier 2 and the black-level comparator 3 cooperate to subject the black level of the output luminance signal "c" to a closed-loop control responsive to the pedestal voltage "e". This closed-loop control is designed so that the black level of the output luminance signal "c" can be equal to the pedestal voltage "e" or held at and below a predetermined reference level.

The prior art black-level correcting apparatus of FIG. 1 has the following over-control problems. Since the black level of a video signal is controlled in response to only luminance components thereof, a dark portion of a corresponding reproduced image which has a color different from a black-and-white color is changed in luminance but is unchanged in color so that the dark portion tends to be appreciably different from the original. Especially, a portion of a reproduced image which has a typical skin color of the yellow race tends to be darker undesirably. Furthermore, in the case of a video signal having a high average luminance, that is, in the case of a video signal representing a bright image, dark portions of a corresponding reproduced image tend to be equally blacked so that the details of the dark portions tend to be unseen.

DESCRIPTION OF THE FIRST PREFERRED EMBODIMENT

Figure 3:
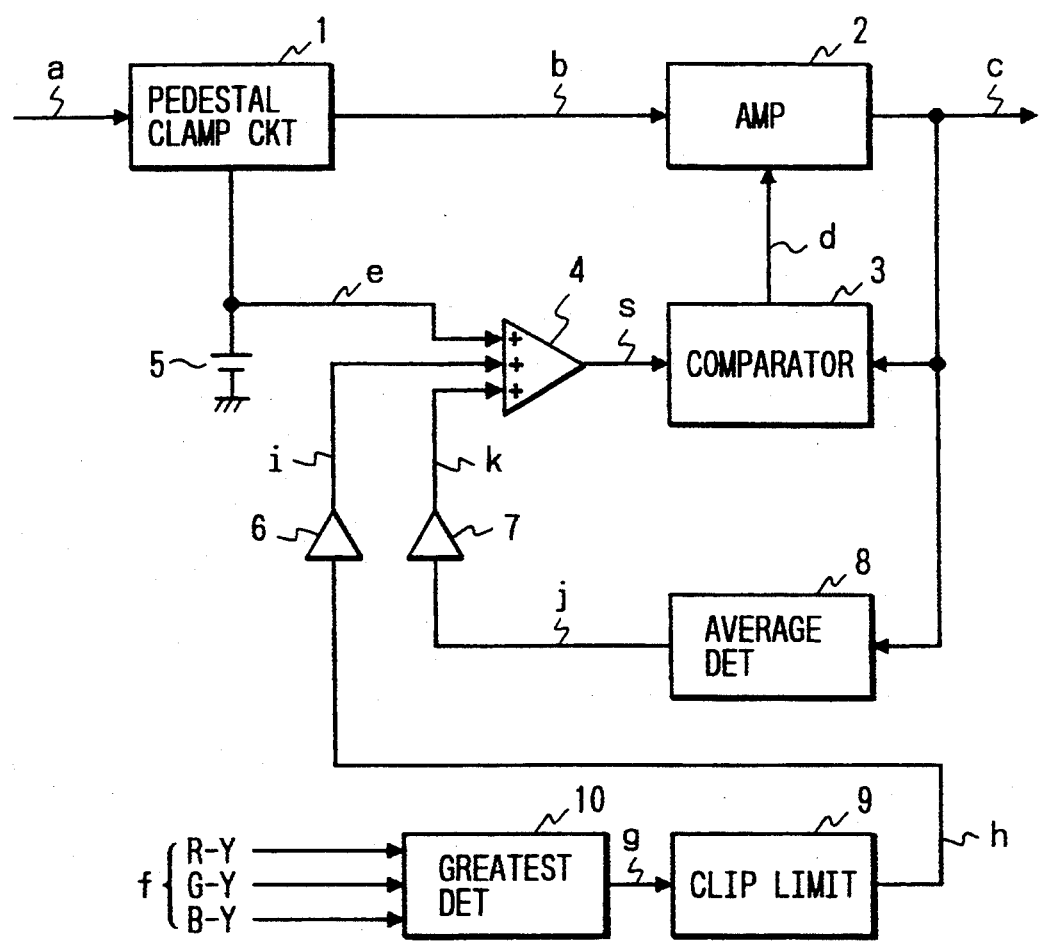
FIG. 3 is a block diagram of a black-level correcting apparatus according to a first embodiment of this invention.

With reference to FIG. 3, a black-level correcting apparatus of a first embodiment of this invention includes a pedestal clamping circuit 1, a variable-gain amplifier 2, a black-level comparator 3, an adder or a summing circuit 4, a dc voltage source 5, gain control circuits 6 and 7, an average level detector 8, a clipping and limiting circuit 9, and a greatest detector 10.

Figure 4:
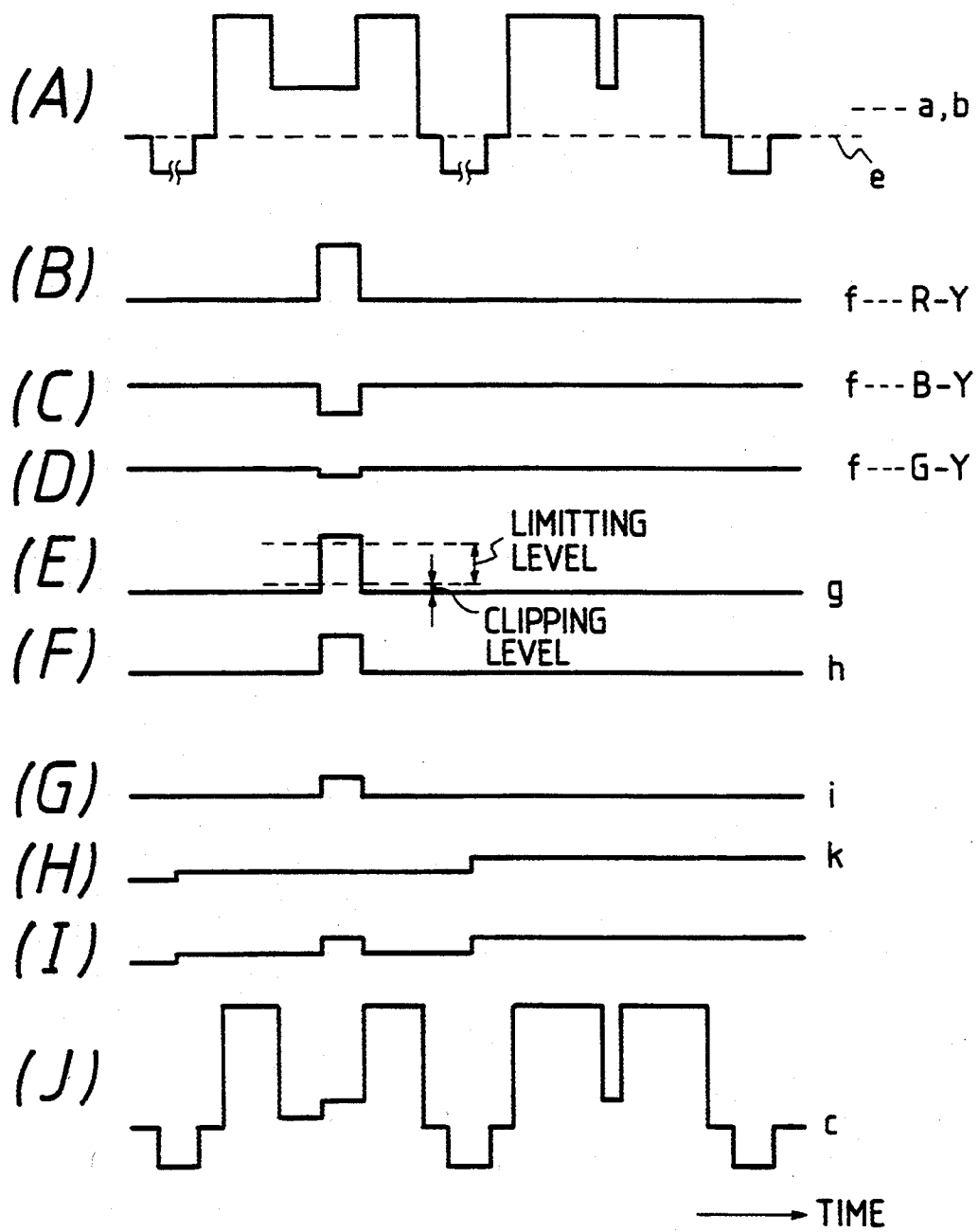
FIG. 4 is a time-domain diagram showing the waveforms of various signals In the black-level correcting apparatus of FIG. 3.

The pedestal clamping circuit 1 receives an input luminance signal "a" which has a waveform such as shown in the part (A) of FIG. 4. The pedestal clamping circuit 1 receives a predetermined pedestal voltage "e" from the dc voltage source 5. The pedestal clamping circuit 1 subjects the input luminance signal "a" to a clamping process responsive to the pedestal voltage "e", and converts the input luminance signal "a" into a clamped luminance signal "b". The clamped luminance signal "b" has a waveform such as shown in the part (A) of FIG. 4.

The amplifier 2 receives the clamped luminance signal "b" from the pedestal clamping circuit 1. The amplifier 2 receives a control signal "d" from the black-level comparator 3. The amplifier 2 expands the tone of a black portion of the clamped luminance signal "b" in response to the control signal "d", and converts the clamped luminance signal "b" into an output luminance signal "c". The output luminance signal "c" has a waveform such as shown in the part (J) of FIG. 4. The gain of the amplifier 2 is determined by the control signal "d", so that the degree of the expansion of the black tone depends on the control signal "d".

The black-level comparator 3 receives the output luminance signal "c" from the amplifier 2. The black-level comparator 3 receives the output signal "s" from the adder 4. As will be made clear later, the output signal "s" from the adder 4 depends on the pedestal voltage "e", an average level of the output luminance signal "c", and a greatest color difference signal "g". The output signal "s" from the adder 4 has a waveform such as shown in the part (I) of FIG. 4. The black-level comparator 3 has a composite structure, including a black-level detector and a comparing section. The black-level detector detects the lowest level of a picture information part of the output luminance signal "c", that is, the level of the darkest picture information segment of the output luminance signal "c". The comparing section compares the detected level of the darkest picture information segment of the output luminance signal "c" with the level of the output signal "s" from the adder 4, and generates the control signal "d" in response to the result of the comparison.

The amplifier 2 and the black-level comparator 3 cooperate to subject the black level of the output luminance signal "c" to a closed-loop control responsive to the pedestal voltage "e", the average level of the output luminance signal "c", and the greatest color difference signal "g".

The average level detector 8 receives the output luminance signal "c" from the amplifier 2. The average level detector 8 detects the average level of the picture information part of the output luminance signal "c", and outputs a signal "j" with a level corresponding to the detected average level of the output luminance signal "c". The gain control circuit 7 receives the average luminance level signal "j" from the average level detector 8. The gain control circuit 7 controls the amplitude of the average luminance level signal "j", and converts the average luminance level signal "j" into a second average luminance level signal "k". The second average luminance level signal "k" has a waveform such as shown in the part (H) of FIG. 4.

A group "f" of three color difference signals R-Y, G-Y, and B-Y is inputted into the greatest detector 10. The greatest detector 10 detects the greatest of the three color difference signals R-Y, G-Y, and B-Y, and selects the greatest color difference signal and outputs the selected color difference signal "g". For example, when the levels of the three color difference signals R-Y, G-Y, and B-Y increase and decrease as shown in the parts (B)-(D) of FIG. 4, the greatest color difference signal "g" varies as shown in the part (E) of FIG. 4.

The clipping and limiting circuit 9 receives the greatest color difference signal "g" from the greatest detector 10. The clipping and limiting circuit 9 has a composite structure, including a clipping section and a limiting section which are connected in series. The clipping section clips the greatest color difference signal "g" with a predetermined clipping level. Specifically, the clipping section transmits the greatest color difference signal "g" which has a level equal to or greater than the clipping level, but cuts off the greatest color difference signal "g" which has a level below the clipping level. In this way, the clipping section cuts off the small-amplitude components of the greatest color difference signal "g". Cutting off the small-amplitude components of the greatest color difference signal "g" suppresses or decreases noise components of the greatest color difference signal "g". The limiting section limits the amplitude of the greatest color difference signal "g" to within a predetermined amplitude, and thereby prevents the amplitude of the greatest color difference signal "g" from exceeding a predetermined limiting level. As a result, the clipping and limiting circuit 9 confines the level of the greatest color difference signal "g" to a given range between an upper limit and a lower limit determined by the limiting level and the clipping level respectively. Thus, the clipping and limiting circuit 9 converts the greatest color difference signal "g" into a level-confined color difference signal "h". For example, when the level of the greatest color difference signal "g" varies around the limiting level and the clipping level as shown in the part (E) of FIG. 4, the output color difference signal "h" from the clipping and limiting circuit 9 varies as shown in the part (F) of FIG. 4. The gain control circuit 6 receives the color difference signal "h" from the clipping and limiting circuit 9. The gain control circuit 6 controls the amplitude of the color difference signal "h", and converts the color difference signal "h" into an amplitude-controlled color difference signal "i". For example, when the level of the color difference signal "h" varies as shown in the part (F) of FIG. 4, the level of the color difference signal "i" varies as shown in the part (G) of FIG. 4.

The adder 4 receives the pedestal voltage "e" from the dc voltage source 5. The adder 4 receives the average luminance level signal "k" from the gain control circuit 7. The adder 4 receives the color difference signal "i" from the gain control circuit 6. The adder 4 sums the levels of the received signals "e", "k", and "i", and combines the signals "e", "k", and "i" into the output signal "s". Thus, the output signal "s" from the adder 4 depends on the pedestal voltage "e", the average level of the output luminance signal "c", and the color difference signal "i" which originates from the greatest color difference signal "g".

The output signal "s" from the adder 4 is fed to the black-level comparator 3. As described previously, the amplifier 2 and the black-level comparator 3 cooperate to subject the black level of the output luminance signal "c" to a closed-loop control responsive to the output signal "s" from the adder 4 which depends on the pedestal voltage "e", the average level of the output luminance signal "c", and the greatest color difference signal "g". This closed-loop control is basically designed so that the black level of the output luminance signal "c" will be held at or near the pedestal voltage "e". In addition, the closed-loop control is designed so that the degree of the expansion of the black level of the output signal "c" will be decreased when the average level of the output luminance signal "c" is high as shown In FIG. 4. Therefore, in the case of a video signal having a high average luminance, that is, in the case of a video signal representing a bright image, dark portions of a corresponding reproduced image are prevented from being equally blacked so that the details of the dark portions can be seen. Furthermore, the closed-loop control is designed so that the degree of the expansion of the black level of the output signal "c" will be decreased when the greatest color difference signal "g" has an appreciable level. The closed-loop control responsive to the greatest color difference signal "g" will be described further. The level of the greatest color difference signal "g" outputted from the greatest detector 10 is minimized when a corresponding part of a reproduced image has a black-and-white color (a gray color). The level of the greatest color difference signal "g" is larger than the minimal level when a corresponding part of a reproduced image has a color different from a black-and-white color (a gray color). The greatest color difference signal "g" is processed by the clipping and limiting circuit 9 so that small-level noise components can be removed from the greatest color difference signal "g", and that the correction of the black level will be prevented from being excessively reduced when the greatest color difference signal "g" has a large level. The color difference signal outputted from the clipping and limiting circuit 9 is transmitted to the black-level comparator 3 via the gain control circuit 6 and the adder 4. As a result, the degree of the expansion of the black level of the output signal "c" will be decreased when the greatest color difference signal has an appreciable level, that is, when a corresponding part of a reproduced image has a color appreciably different from a black-and-white color (a gray color). Thus, a dark portion of a corresponding reproduced image which has a color different from a black-and-white color is prevented from undesirably changing in luminance. Especially, a portion of a reproduced image which has a typical skin color of the yellow race is prevented from being darker undesirably.

It should be noted that the pedestal clamping circuit 1 may be replaced by a sync top clamping circuit.

DESCRIPTION OF THE SECOND PREFERRED EMBODIMENT

Figure 5:
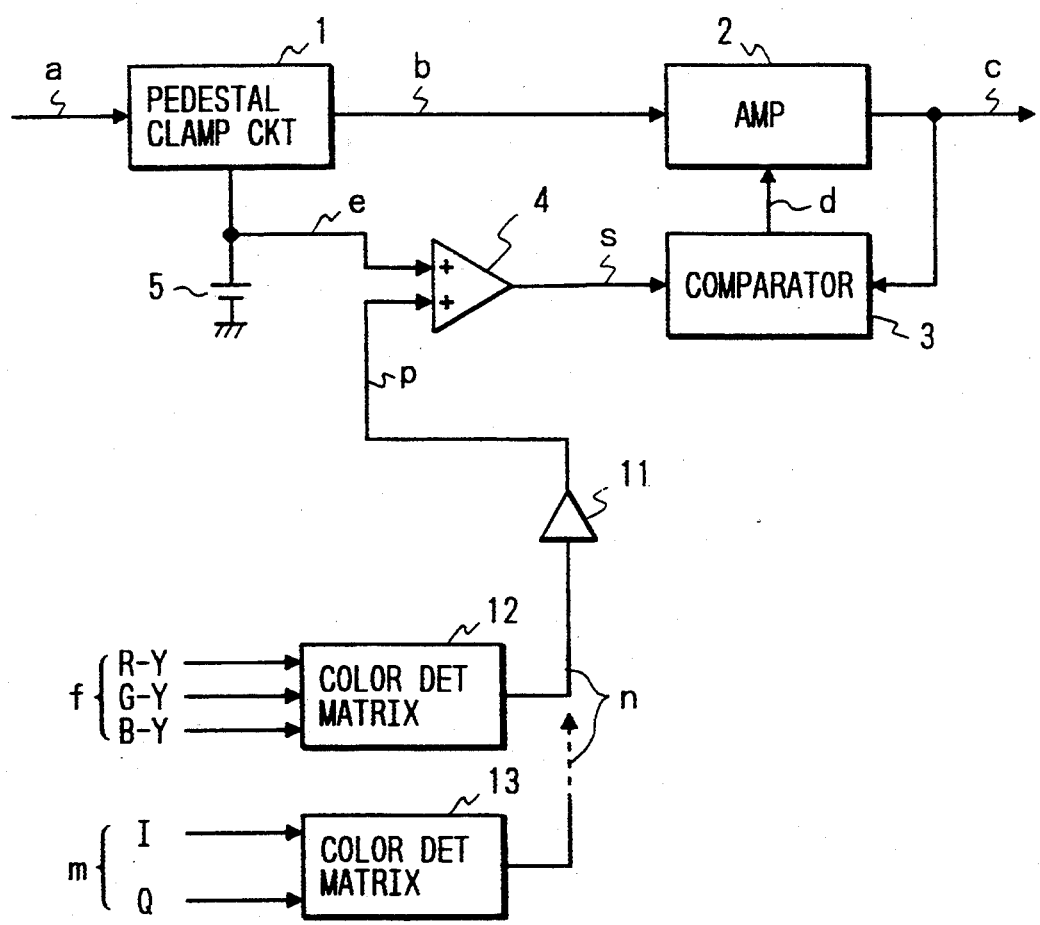
FIG. 5 is a block diagram of a black-level correcting apparatus according to a second embodiment of this invention.

With reference to FIG. 5, a black-level correcting apparatus of a second embodiment of this invention includes a pedestal clamping circuit 1, a variable-gain amplifier 2, a black-level comparator 3, an adder or a summing circuit 4, a dc voltage source 5, a gain control circuit 11, and color detection matrix circuits 12 and 13.

The pedestal clamping circuit 1 receives an input luminance signal "a" which has a waveform such as shown in the part (A) of FIG. 6. The pedestal clamping circuit 1 receives a predetermined pedestal voltage "e" from the dc voltage source 5. The pedestal clamping circuit 1 subjects the input luminance signal "a" to a clamping process responsive to the pedestal voltage "e", and converts the input luminance signal "a" into a clamped luminance signal "b". The clamped luminance signal "b" has a waveform such as shown in the part (A) of FIG. 6.

The amplifier 2 receives the clamped luminance signal "b" from the pedestal clamping circuit 1. The amplifier 2 receives a control signal "d" from the black-level comparator 3. The amplifier 2 expands the tone of a black portion of the clamped luminance signal "b" in response to the control signal "d", and converts the clamped luminance signal "b" into an output luminance signal "c". The output luminance signal "c" has a waveform such as shown in the part (H) of FIG. 6. The gain of the amplifier 2 is determined by the control signal "d", so that the degree of the expansion of the black tone depends on the control signal "d".

The black-level comparator 3 receives the output luminance signal "c" from the amplifier 2. The black-level comparator 3 receives the output signal "s" from the adder 4. As will be made clear later, the output signal "s" from the adder 4 depends on the pedestal voltage "e" and a predetermined-color detection signal. The output signal "s" from the adder 4 has a waveform such as shown in the part (G) of FIG. 6. The black-level comparator 3 has a composite structure, including a black-level detector and a comparing section. The black-level detector detects the lowest level of a picture information part of the output luminance signal "c", that is, the level of the darkest picture information segment of the output luminance signal "c". The comparing section compares the detected level of the darkest picture information segment of the output luminance signal "c" with the level of tile output signal "s" from the adder 4, and generates the control signal "d" in response to the result of the comparison.

The amplifier 2 and the black-level comparator 3 cooperate to subject the black level of the output luminance signal "c" to a closed-loop control responsive to the pedestal voltage "e" and a predetermined-color detection signal.

A group "f" of three color difference signals R-Y, G-Y, and B-Y is inputted into the color detection matrix circuit 12. The color detection matrix circuit 12 detects a predetermined-color signal component in response to at least two of the color difference signals R-Y, G-Y, and B-Y. Specifically, the predetermined color is chosen so as to agree with a typical skin color of the yellow race. For example, the color detection matrix circuit 12 detects the predetermined-color signal component "n" in response to the color difference signals R-Y and B-Y by referring to the following equation.

$$n = (R\text{-}Y) \times 0.74 + (B\text{-}Y) \times 0.27$$

where "x" denotes an operator of production. The color detection matrix circuit 12 outputs a signal "n" representing the detected color signal component. For example, when the levels of the three color difference signals R-Y, G-Y, and B-Y increase and decrease as shown in the parts (B)-(D) of FIG. 6, the color detection signal "n" varies as shown in the part (E) of FIG. 6.

A group "m" of two color signals "I" and "Q" is inputted into the color detection matrix circuit 13. The color detection matrix circuit 13 detects a predetermined-color signal component in response to the color signals "I" and "Q". Specifically, the predetermined color is chosen so as to agree with a typical skin color of the yellow race. The color detection matrix circuit 13 outputs a signal "n" representing the detected color signal component.

One of the color detection matrix circuits 12 and 13 is selected and activated by a suitable switch arrangement in dependence on the type of a color demodulator which precedes the black-level correcting apparatus.

The gain control circuit 11 receives the color detection signal "n" from the color detection matrix circuit 12 or the color detection matrix circuit 13. The gain control circuit 11 controls the amplitude of the color detection signal "n", and converts the color detection signal "n" into an amplitude-controlled color detection signal "p". For example, when the level of the color detection signal "n" varies as shown in the part (E) of FIG. 6, the level of the color detection signal "p" varies as shown in the part (F) of FIG. 6.

The adder 4 receives the pedestal voltage "e" from the dc voltage source 5. The adder 4 receives the color detection signal "p" from the gain control circuit 11. The adder 4 sums the levels of the received signals "e" and "p", and combines tile signals "e" and "p" into the output signal "s". Thus, the output signal "s" from the adder 4 depends on the pedestal voltage "e" and the color detection signal "p".

The output signal "s" from the adder 4 is fed to the black-level comparator 3. As described previously, the amplifier 2 and the black-level comparator 3 cooperate to subject the black level of the output luminance signal "c" to a closed-loop control responsive to the output signal "s" from the adder 4 which depends on the pedestal voltage "e" and the color detection signal "s". This closed-loop control is basically designed so that the black level of the output luminance signal "c" will be held at or near the pedestal voltage "e". In addition, the closed-loop control is designed so that the degree of the expansion of the black level of the output signal "c" will be decreased when the color detection signal "p" has an appreciable level, that is, when a corresponding part of a reproduced image has a color essentially equal to the predetermined color detected by the color detection matrix circuit 12 or 13. Thus, a portion of a reproduced image which has a typical skin color of the yellow race is prevented from being darker undesirably.

It should be noted that the pedestal clamping circuit 1 may be replaced by a sync top clamping circuit.

What is claimed is:

1. An apparatus for correcting a black level of a video signal, comprising:

a pedestal clamp circuit for clamping a pedestal level of an input luminance signal in response to a predetermined pedestal voltage, and converting the input luminance signal into a clamped luminance signal;

a black-level expanding circuit for expanding a tone of a black portion of the clamped luminance signal, and converting the clamped luminance signal into a black-level expanded luminance signal;

a color detection matrix circuit for detecting a predetermined-color portion in response to an input color difference signal;

a gain control circuit for controlling an amplitude of an output signal from the color detection matrix circuit;

an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by the black-level expanding circuit in response to a difference between the detected blackest portion of the black-level expanded luminance signal and the output signal from the adding circuit.

2. An apparatus for correcting a black level of a video signal, comprising:

a pedestal clamp circuit for clamping a pedestal level of an input luminance signal in response to a predetermined pedestal voltage, and converting the input luminance signal into a clamped luminance signal;

a black-level expanding circuit for expanding a tone of a black portion of the clamped luminance signal, and converting the clamped luminance signal into a black-level expanded luminance signal;

a color detection matrix circuit for detecting a predetermined-color portion in response to an input color demodulation signal;

a gain control circuit for controlling an amplitude of an output signal from the color detection matrix circuit;

an adding circuit for adding an output signal from the gain control circuit and the pedestal voltage; and a black-level comparing circuit, responsive to the black-level expanded luminance signal and an output signal from the adding circuit, for detecting a blackest portion of the black-level expanded luminance signal, comparing the detected blackest portion of the black-level expanded luminance signal with the output signal from the adding circuit, and controlling a degree of expanding the black tone by tile black-level expanding circuit in response to a difference between the detected blackest portion of the black-level expanded luminance signal and the output signal from the adding circuit.

3. In an apparatus for controlling a black level of luminance components of a video signal with respect to a reference level in a closed-loop control, the improvement comprising:

means for detecting whether or not an image represented by the video signal has a color different from a gray between black and white, and outputting a detection signal representative thereof; and means for varying the reference level in response to the detection signal.

4. In an apparatus for controlling a black level of luminance components of a video signal with respect to a reference level in a closed-loop control, the improvement comprising:

means for detecting a component of the video signal which corresponds to a predetermined color different from a gray between black and white, and outputting a detection signal representative thereof; and means for varying the reference level in response to the detection signal.

5. An apparatus as recited in claim 3, wherein said means for detecting comprises greatest-detecting means for detecting a greatest color difference signal and generating a first signal representing a greatest color difference signal component of the video signal, said means for varying responsive to said first signal for decreasing expansion of the black level of the video signal when said first signal exceeds a predetermined level representing a portion of the image being different from gray, thereby preventing undesirable darkening of non-gray colors.

6. An apparatus as recited in claim 5, further comprising means for clipping and limiting said first signal and providing a confined signal for controlling said means for varying to decrease said expansion of the black level of said video signal.

7. An apparatus as recited in claim 4, wherein said means for detecting comprises greatest-detecting means for detecting a greatest color difference signal and generating a first signal representing a greatest color difference signal component of the video signal, said means for varying responsive to said first signal for decreasing expansion of the black level of the video signal when said first signal exceeds a predetermined level representing a portion of the image being different from gray, thereby preventing undesirable darkening of non-gray colors.

8. An apparatus as recited in claim 7, further comprising means for clipping and limiting said first signal and providing a confined signal for controlling said means for varying to decrease said expansion of the black level of said video signal.

* * * * *